J. KLEIN.
SELF LEVELING ARTICLE OF FURNITURE.
APPLICATION FILED FEB. 7, 1914.

1,116,296.

Patented Nov. 3, 1914.
2 SHEETS—SHEET 1.

Witnesses

Inventor
J. Klein,
By Victor J. Evans
Attorney

UNITED STATES PATENT OFFICE.

JOHN KLEIN, OF PRINCE ALBERT, SASKATCHEWAN, CANADA.

SELF-LEVELING ARTICLE OF FURNITURE.

1,116,296.     Specification of Letters Patent.     Patented Nov. 3, 1914.

Application filed February 7, 1914.   Serial No. 817,262.

*To all whom it may concern:*

Be it known that I, JOHN KLEIN, a citizen of the Dominion of Canada, residing at Prince Albert, Saskatchewan, Canada, have invented new and useful Improvements in Self-Leveling Articles of Furniture, of which the following is a specification.

The primary intention of the invention is the provision of a table designed chiefly for sea-going boats and vessels which under ordinary conditions will maintain a horizontal position irrespective of the pitching or rolling of the ship.

While the invention is designed chiefly for tables for sea-going craft nevertheless it is to be understood that it may be adapted for any article which, when supported upon a surface adapted to have its position to the horizontal changing, is to preserve a true level relation.

The invention consists of a support or stand, a ball and socket connection between such support or stand and the article to be maintained in a horizontal position, and novel connecting means between such article and a member of the ball and socket connection whereby provision is had for limiting the swinging movement of the article and preventing a circular motion thereof.

The invention consists of the novel features, details of construction and combination of parts, which hereinafter will be more particularly set forth, illustrated in the accompanying drawings, and pointed out in the appended claims.

Figure 1:
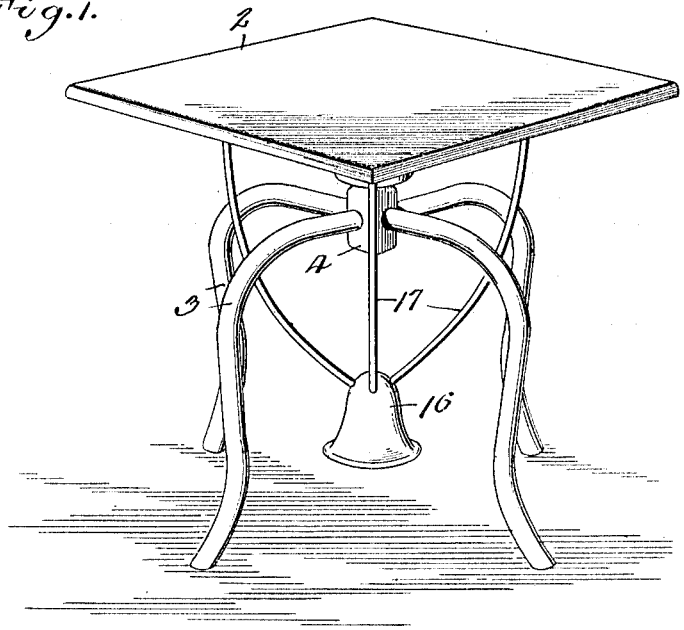
Figure 3:
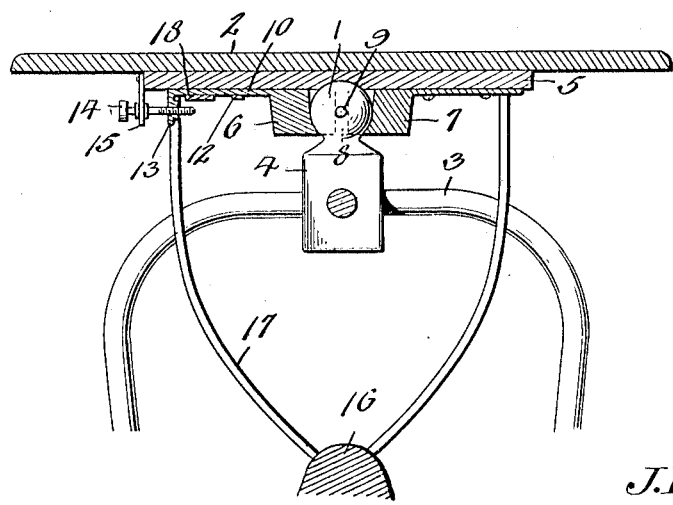
Figure 2:
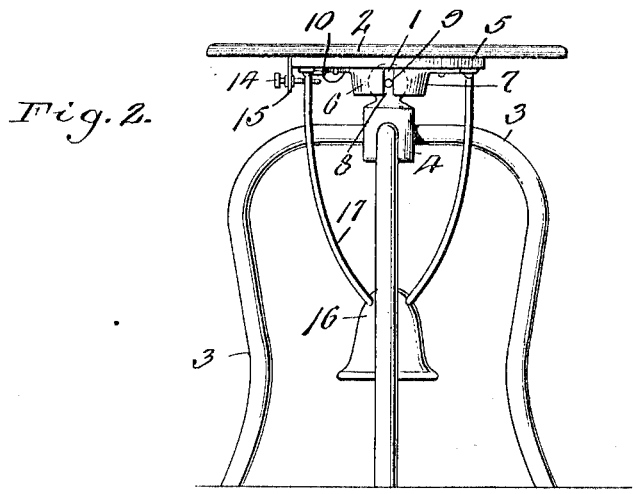
Figure 4:
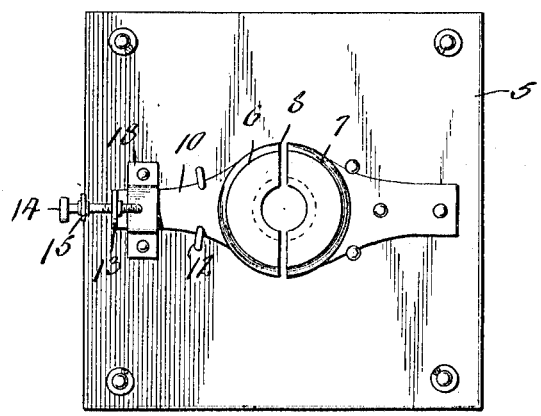

Referring to the drawings forming a part of the specification, Figure 1 is a perspective view showing the invention adapted for supporting a table. Fig. 2 is a view in elevation. Fig. 3 is a sectional view showing more clearly the ball and socket connection and the means for adjusting the movable member of the socket. Fig. 4 is a view of the socket member of the connection inverted.

Corresponding and like parts are referred to in the following description and indicated in all the views, of the drawings by the same reference characters.

The support or stand terminates in a ball 1 which coöperates with a socket member attached to the table top 2 or other article to be supported in a horizontal position. Within the purview of the invention the support or stand may be of any design or construction and as shown comprises legs 3 and a head 4, the latter terminating at its upper end in the ball 1. The legs 3 may be secured to the head 4 in any manner. It is to be understood that the legs 3 may be of any configuration or design depending upon the finish of the completed article.

Inasmuch as the invention is intended chiefly for tables it is shown in connection with a table top 2 but it is to be understood that such table top is illustrative of the article adapted to be secured to the socket member. The socket member consists of a plate 5 and side pieces 6 and 7. The plate 5 is slightly depressed to receive the tip of the ball 1 and the side pieces 6 and 7 are recessed in their opposing or meeting faces to receive the side portions of the ball 1. The side piece 6 is adjustable whereas the side piece 7 is fixed. A space 8 is formed between the side pieces 6 and 7 to receive stops 9 which project from opposite sides of the ball 1 and prevent circular movement of the table top 2 or like article as well as limiting the swing thereof. The stops 9 constitute the ends of a pin which is passed through the ball 1. The side piece 6 is formed with a lateral extension 10 which is held to the under side of the plate 5 in a manner to admit of the side piece 6 being adjusted toward or away from the side piece 7. A keeper 18 is secured at its ends to the plate 5 and extends across the part 10. Fastenings 12 let into the plate 5 engage the lateral extension 10 and serve to hold it in place and direct the same in its movements. The outer end of the lateral extension 10 has a pendent portion 13 in which is formed a threaded opening to receive an adjusting screw 14 which is mounted in an extension 15 pendent from the plate 5. The adjusting screw 14 has a swivel connection with the pendent part 15 so that upon turning the adjusting screw the side piece 6 is moved in or out to vary the width of the space 8 with the result that the swinging movement of the table top is adapted to be regulated.

The table top 2 or like part is held in a horizontal position by means of a weight 16 which is of sufficient mass to effect the desired result. The weight 16 normally occupies a central position which is in vertical line with the ball and socket connection between the stands and table top such weight being attached to the lower ends of rods 17 or like connecting parts which are attached at their upper ends to the plate 5 or part attached to such plate. The weight 16 may be ornamental so as to add materially to the pleasing appearance of the article. The rods or like connecting means 17 are arranged to occupy the spaces formed between the legs 3.

It will be understood from the foregoing taken in connection with the accompanying drawings that the invention may be adapted for supporting any article in horizontal position upon a surface which is adapted to assume various inclinations to the horizontal, such for instance as the floor of a ship or other carrier. It is to be understood that the weight must be of such a mass and distance below the ball and socket connection as to hold the table top or like article in horizontal position even when such article is provided with a superimposed load which is unevenly distributed, such for instance as when the table is set with dishes for serving a meal.

From the foregoing description, taken in connection with the accompanying drawings, the advantages of the construction and of the method of operation will be readily apparent to those skilled in the art to which the invention appertains, and while I have described the principle of operation of the invention together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. Means for sustaining an article in horizontal position when placed upon a surface whose inclination to the horizontal varies, said means comprising a support, a ball at the upper end of such support, a socket comprising side pieces between which the ball is received, said side pieces having a space between them, stops projecting from opposite sides of the ball and entering the space formed between the side pieces of the socket and means for adjusting the side pieces of the socket to vary the space formed between them whereby provision is had for controlling the movement of the article to be supported.

2. Means for supporting an article in horizontal position when placed upon a surface whose inclination to the horizontal is adapted to change, said means comprising a support, a ball at the upper end of the support, a plate receiving the vertical thrust of the ball, side pieces receiving the ball between them, one of such side pieces being secured to the plate in a fixed position and the other side piece being adjustable, means mounted upon the plate for moving the adjusted side piece toward or away from the fixed side piece to vary the space between such side piece and stops at the sides of the ball entering the space formed between the said side pieces.

3. Means for supporting an article in horizontal position upon a surface whose position to the horizontal is adapted to vary, said means comprising a support, a ball at the upper end of the support, a plate receiving the vertical thrust of the ball, side pieces receiving the ball between them, one of such side pieces being secured in a fixed position and the other side piece being adjustable, stops at the sides of the ball extending into the space formed between the side pieces, means for adjusting the movable side piece toward or away from the fixed side piece and a weight suspended from the said plate to hold the article in a horizontal position.

In testimony whereof I affix my signature in presence of two witnesses.

JOHN KLEIN.

Witnesses:
J. McMillan,
Annie Whitford.

Copies of this patent may be obtained for five cents each, by addressing the "Commissioner of Patents, Washington, D. C."